Sept. 15, 1959     O. E. BALJE ET AL     2,904,307
COOLING TURBINE

Filed Oct. 1, 1956     3 Sheets-Sheet 3

OTTO E. BALJE
CLYDE R. STEIN
INVENTORS

BY Lyon & Lyon

ATTORNEYS

United States Patent Office 2,904,307
Patented Sept. 15, 1959

2,904,307
COOLING TURBINE

Otto E. Baljé, Hollywood, and Clyde R. Stein, Los Angeles, Calif., assignors, by mesne assignments, to Crane Co., Chicago, Ill., a corporation of Illinois Application October 1, 1956, Serial No. 613,233

1 Claim. (Cl. 253—55)

This invention relates to a turbine and more particularly to a dual turbine arrangement especially designed for cooling the air supplied to two separate compartments of an aircraft, which compartment may have different mass flow and temperature requirements.

It is conventional to employ turbines for cooling pressurized air supplied to the cabins of aircraft by extracting work from the air. However, so far as is known, a dual turbine employing a single disc with separate and geometrically dissimilar sets of blades upon its opposite sides, with a common inlet and separate outlets, has not hitherto been proposed.

It is accordingly one object of this invention to provide such a dual turbine having such single disc carrying separate and geometrically dissimilar sets of blades on opposite sides.

It is a further object of this invention to provide a dual turbine of the type described having a single inlet but separate outlets which may be used to supply air to separate compartments under different temperatures and mass flow conditions.

It is a further object of this invention to provide a dual turbine of the type described having adjustable nozzle means for each element of the turbine and a common control for both of said means.

The use of two separate cooling turbines for cooling air supplied to separate compartments of an aircraft is a possibility, but the present invention presents significant advantages over such suggestion, i.e., only one set of bearings, one overspeed control, one inlet scroll, one oil seal etc. are required. This results in a simplicity of design with attendant weight saving. In view of the "weight growth factor," wherein each increment in the weight of an aircraft is multiplied by additional power requirements, additional fuel requirements, additional strength requirements etc. which in turn compound each other in order to maintain given performance, the importance of weight saving is paramount.

Furthermore, as a result of the double wheel design, there is less axial thrust imposed upon the bearings, making smaller bearings possible.

Another advantage of the dual turbine is that air discharge from one side thereof is adjacent the bearings, enabling them to run cooler.

In addition, a double sided disc provides better stress distribution in the disc which in turn permits higher turbine speeds. Also viscous friction which occurs on the back side of a conventional turbine disc is completely eliminated.

Another advantage of the present invention is flexibility of design, e.g. the blades of each set may have different shapes and tip diameters to meet different requirements, or the nozzles may have different angles or be of different length.

These and other objects, features and advantages will be apparent from the annexed specification, in which.

Figure 1:
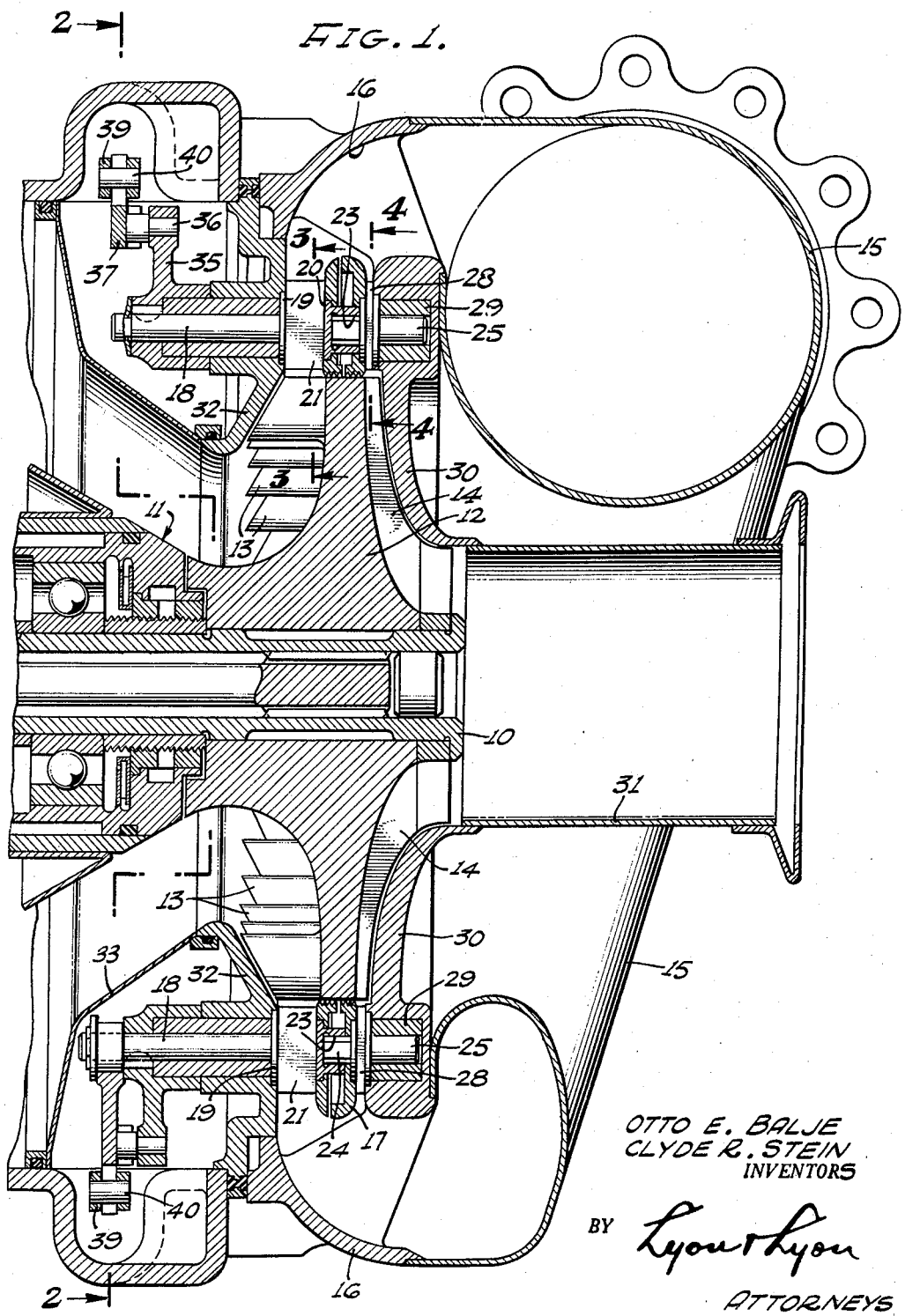
Figure 1 is a vertical section through a dual turbine embodying the present invention.
Figure 2:
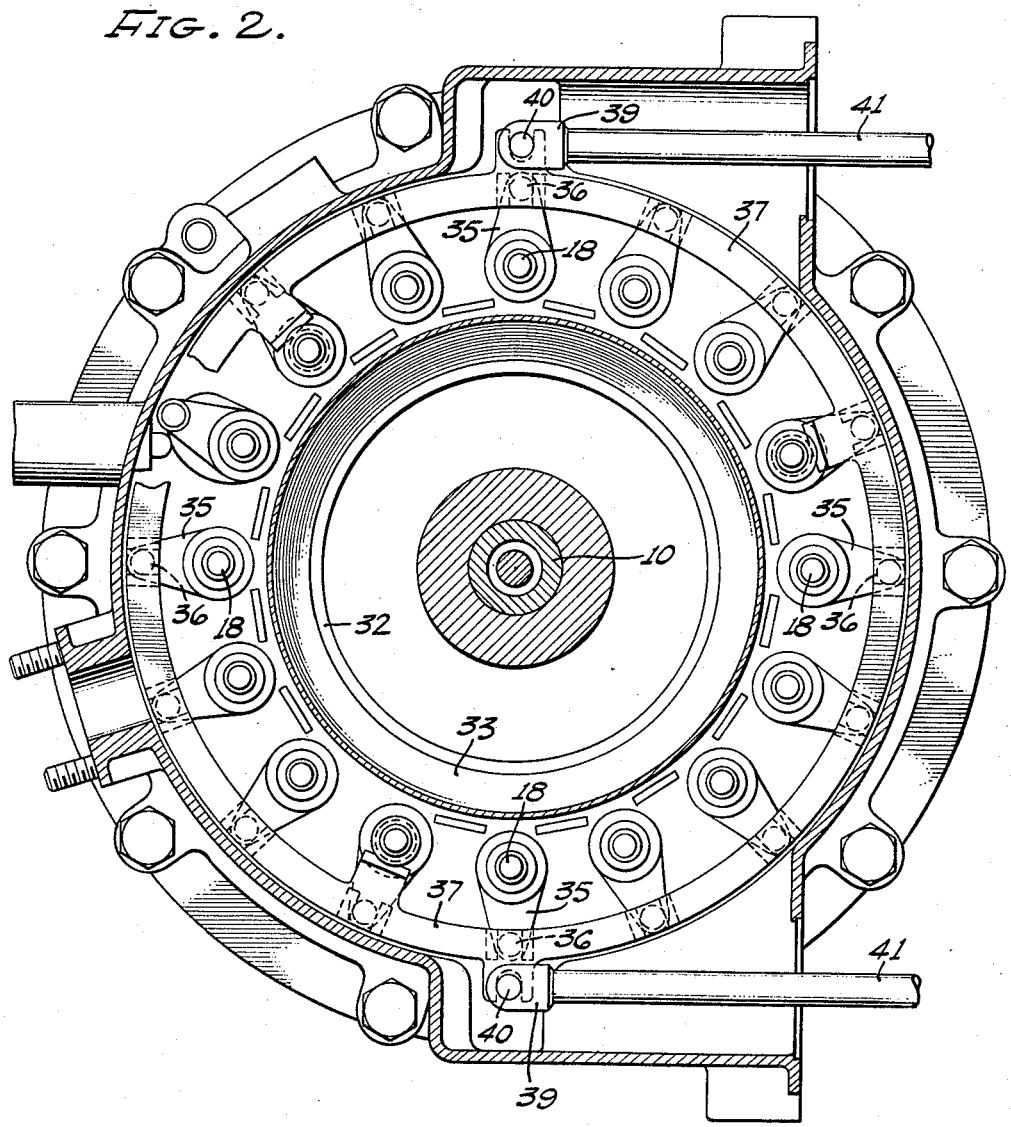
Figure 2 is a section taken along the line 2—2 of Figure 1.
Figure 3:
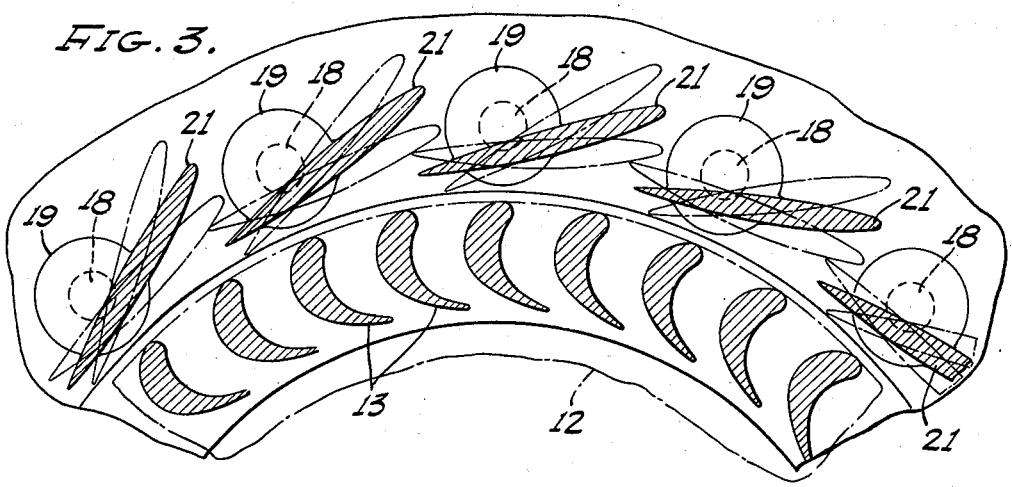
Figure 3 is a fragmentary section taken along the line 3—3 of Figure 1.
Figure 4:
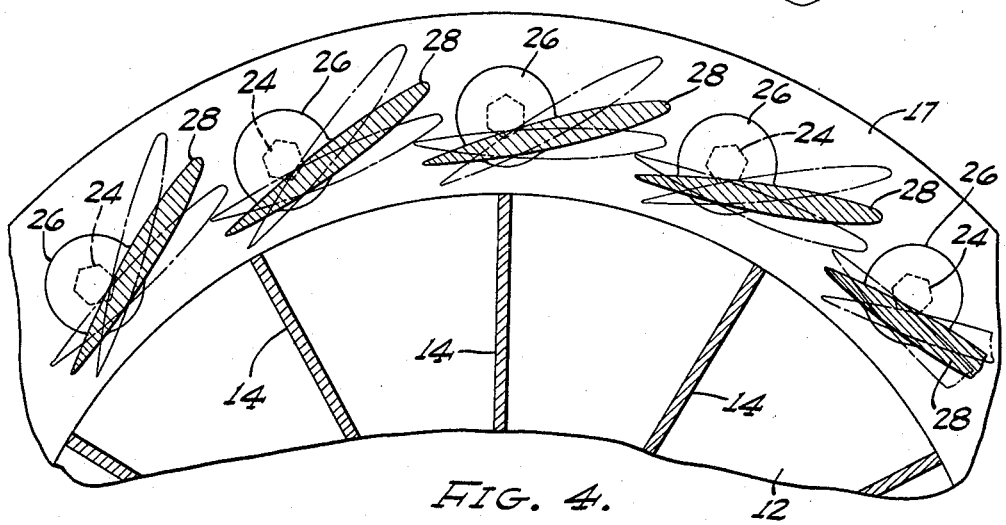
Figure 4 is a fragmentary section taken along the line 4—4 of Figure 1.

Referring now more particularly to the drawings, turbine shaft 10 is mounted in a suitable bearing assembly 11, and keyed thereto is disc 12. Disc 12 is provided on one side thereof with a set of scoops or blades 13 and on the other side with such a set 14. A scroll 15 feeds air under pressure to a common inlet 16, in which is mounted a partition 17. Partition 17 is mounted on a plurality of shafts 18 journalled in bearings carried by the housing.

Figure 5:
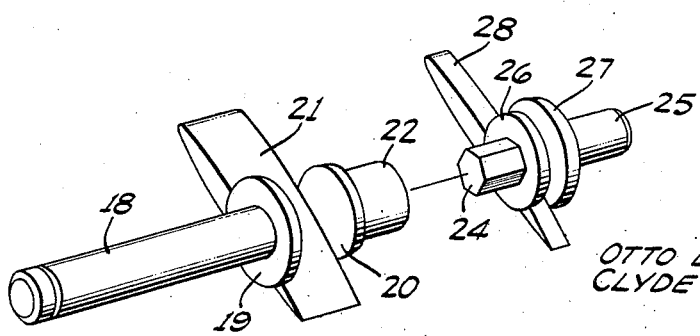
Figure 5 is an exploded perspective of part of the nozzle mechanism.

Referring now particularly to Figures 1 and 5, it will be seen that shafts 18 are each provided with collars 19 and 20, between which are affixed nozzles 21. An enlarged portion 22 of shafts 18 provides a hexagonal socket 23 for hex end 24 of shafts 25. Shafts 25 are provided with collars 26 and 27, between which are affixed nozzles 28. Shafts 25 are journalled in bearings 29 in shroud 30. Shroud 30 directs air from nozzles 28 over blades 14 to outlet 31. A shroud 32 directs air from nozzles 21 over blades 13 to outlet 33.

Each shaft 18 carries a crank arm 35 keyed thereto which in turn pivotally receives a pin 36 carried by a ring 37. Ring 37 carries a pair of clevises 39 for receiving pins 40 of operating rods 41.

The operation of the above-described mechanism is as follows: Air from shroud 15 is divided by partition 17 into two streams. One stream engages blades 14 on one side of disc 12 and the other stream engages blades 13. The separate streams pass to outlets 31 and 33. Functioning of the dual turbine is controlled by varying the attitude of nozzles 21 and 28 by manipulating rods 41. It will be noted that the discharge of air through outlet 33 is immediately adjacent bearing assembly 11, thus cooling the main bearing of the dual turbine.

While there has been described what is at present considered the preferred embodiment of the invention, it will be understood that various changes and alterations may be made therein without departing from the essence of the invention and it is intended to cover herein all such changes and alterations as come within the true scope and spirit of the annexed claim.

We claim:

A turbine comprising: a housing; a disc rotatably mounted in said housing; sets of blades mounted on both sides of said disc; a single air inlet in said housing; means mounted in said housing adjacent said inlet for directing air over both sets of blades; a plurality of nozzle means in the path of the thus directed air for directing the angle of impingement of said air against said blades and means for simultaneously varying each of said nozzle means; a pair of outlets in said housing, being respectively one each for air directed against each of said sets of blades; one of said sets of blades being disposed at a different angle on said disc than the other of said sets of blades; said nozzle means including a plurality of shafts mounted in said housing; a pair of vanes on each shaft respectively on either side of said disc, and means operatively connected thereto for rotating said shafts.

References Cited in the file of this patent

UNITED STATES PATENTS

| | | |
|---|---|---|
| 2,405,190 | Darling | Aug. 9, 1946 |
| 2,427,307 | Schleyer | Sept. 9, 1947 |
| 2,709,893 | Birmann | June 7, 1955 |
| 2,791,968 | Rupp | May 14, 1957 |

FOREIGN PATENTS

| | | |
|---|---|---|
| 13,930 | Great Britain | 1914 |
| 610,572 | Great Britain | Oct. 18, 1948 |
| 701,503 | Great Britain | Dec. 30, 1953 |